United States Patent

Jacobs et al.

[15] 3,669,386
[45] June 13, 1972

[54] AIRFOIL INCLUDING FLUIDICALLY CONTROLLED JET FLAP

[72] Inventors: Willi F. Jacobs; Maximilian F. Platzer, both of Atlanta, Ga.

[73] Assignee: Lockheed Aircraft Corporation, Burbank, Calif.

[22] Filed: May 25, 1970

[21] Appl. No.: 40,270

[52] U.S. Cl. ............................................244/52, 244/42 CC
[51] Int. Cl. ..................................B64b 1/36, B64c 15/14
[58] Field of Search ..........................244/42 CC, 52, 90, 40

[56] References Cited

UNITED STATES PATENTS 3,362,660  1/1968  Tyler.................................244/42 CC

*Primary Examiner*—Milton Buchler
*Assistant Examiner*—Carl A. Rutledge
*Attorney*—Roger T. Frost and George C. Sullivan

[57] ABSTRACT

Controlled deflection of a jet flap emanating from an airfoil is accomplished by control fluid streams aligned at a substantial angle to the fluid jet which produces the jet flap. Disclosed embodiments show the use of the fluidically controlled jet flap to adjust the attitude and/or airfoil loading of an aircraft, to generate oscillatory lift forces for flight flutter testing of an aircraft, and to generate and control gusts in wind tunnels.

8 Claims, 7 Drawing Figures

PATENTED JUN 13 1972  3,669,386
SHEET 1 OF 4
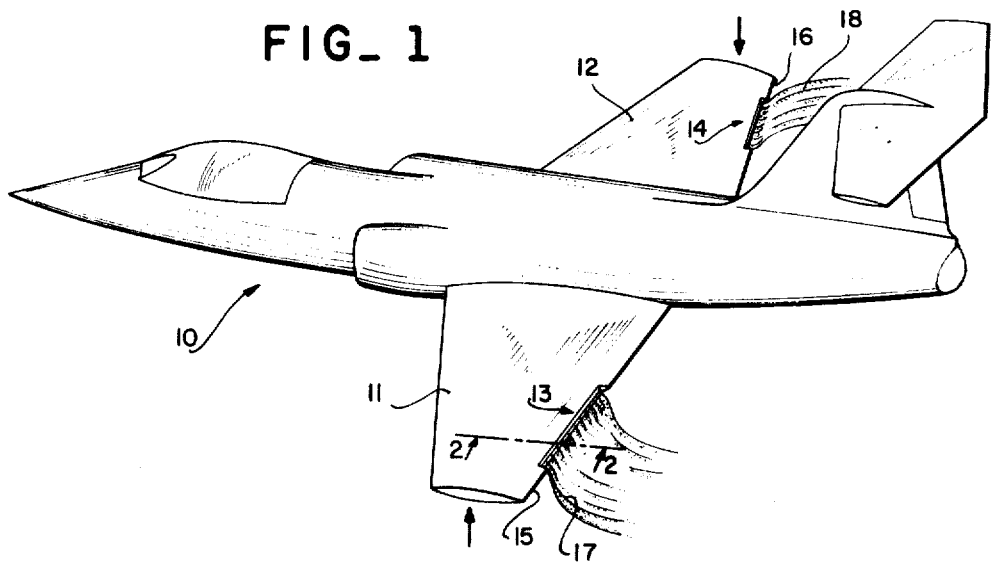
FIG_1
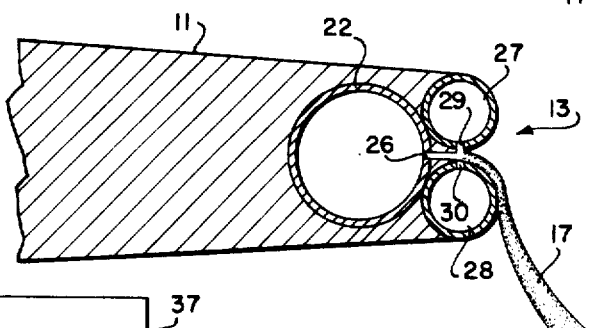
FIG_2
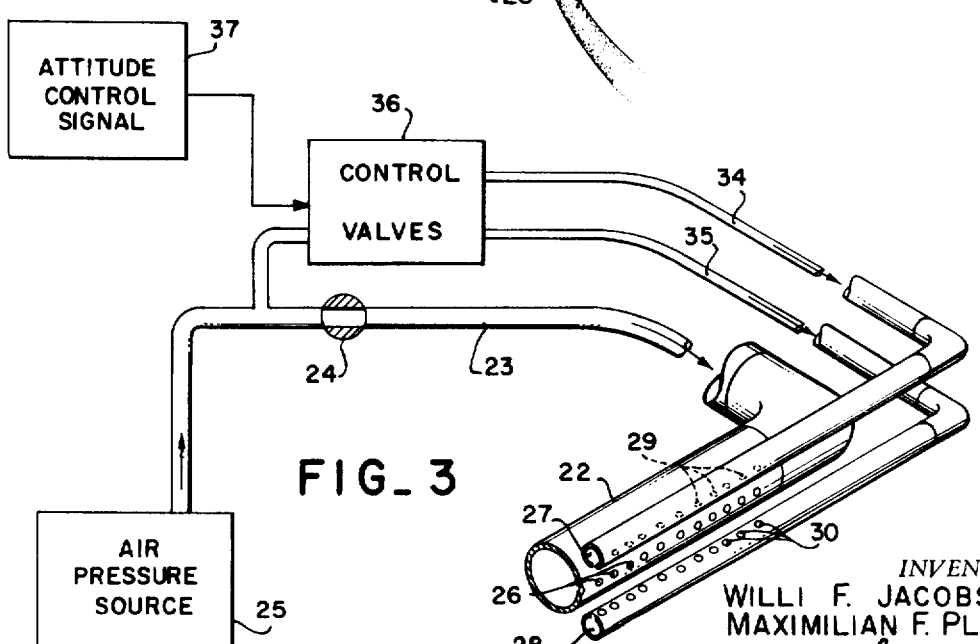
FIG_3
INVENTORS
WILLI F. JACOBS
MAXIMILIAN F. PLATZER
By George C. Sullivan, agent
Roger T. Frost
Attorney

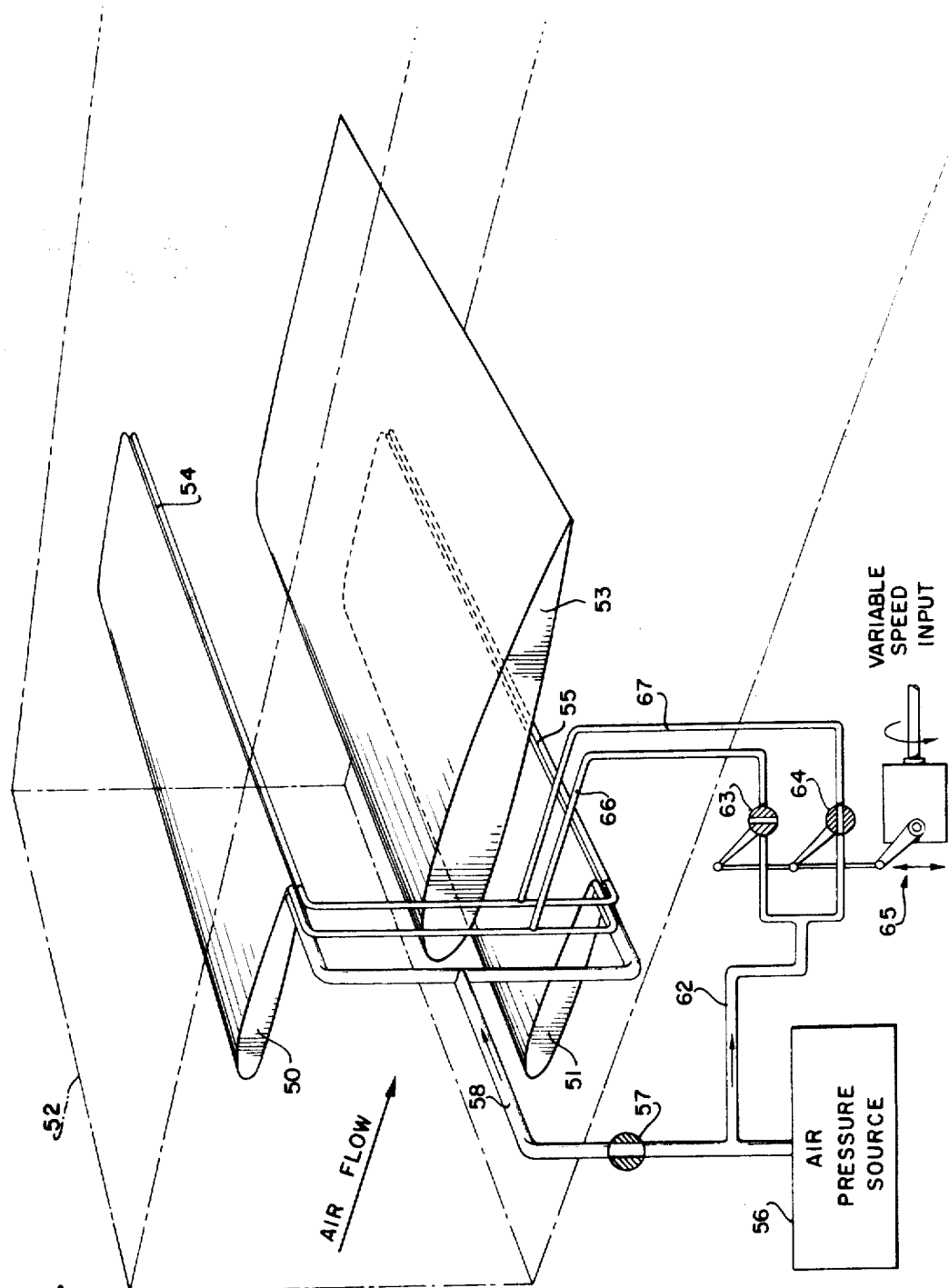
FIG._4

FIG_5
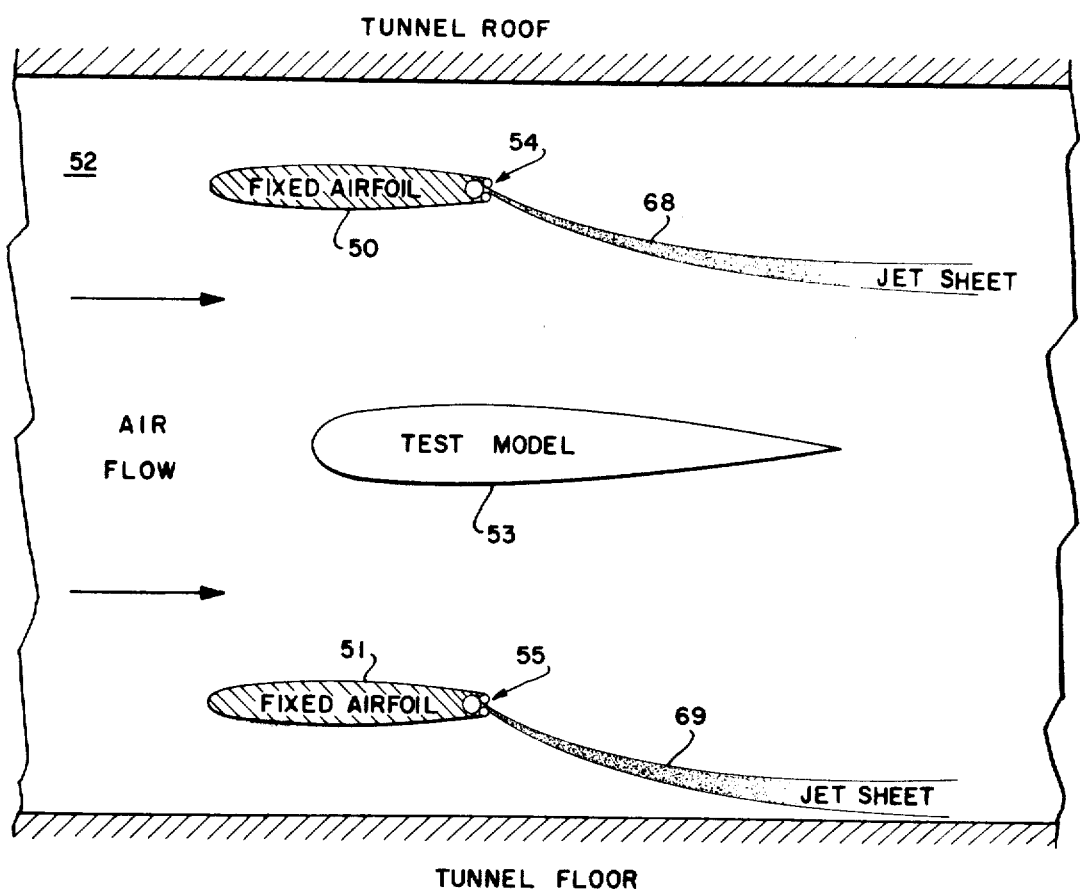

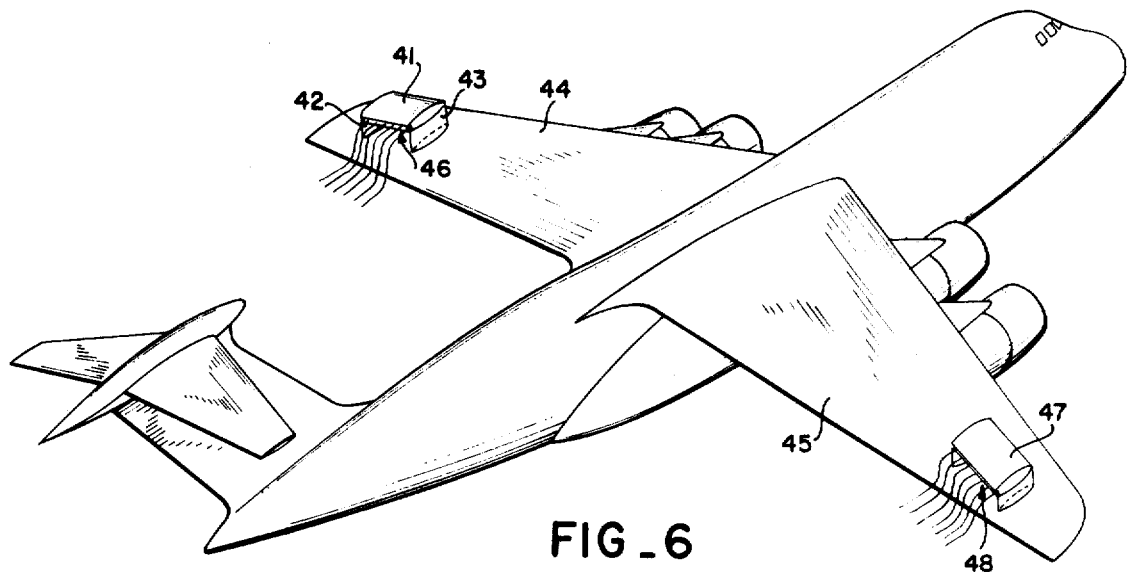
FIG_6
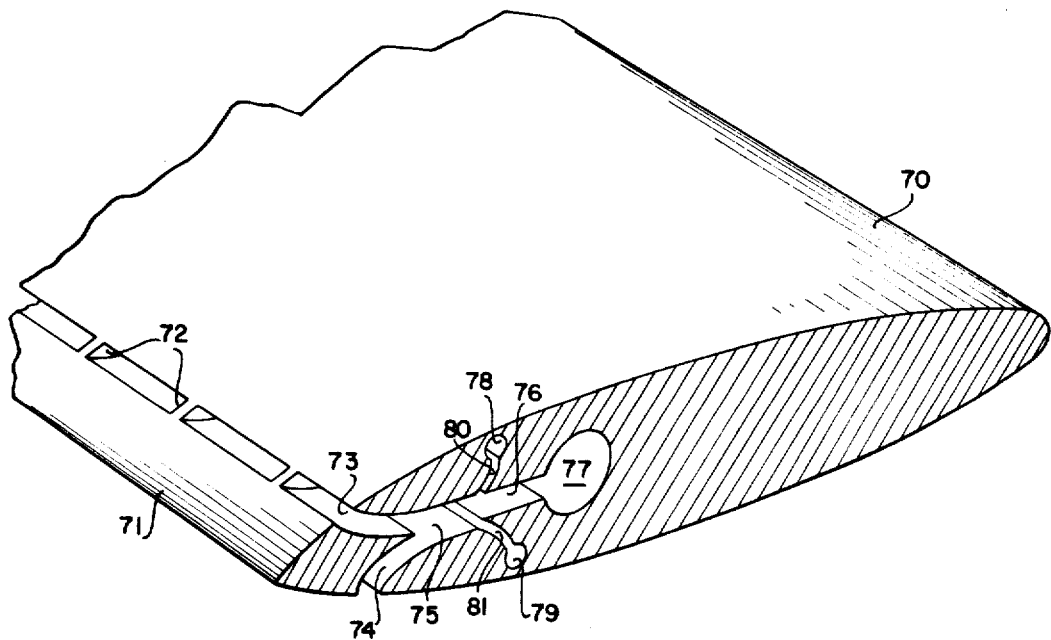
FIG_7
INVENTORS
WILLI F. JACOBS
MAXIMILIAN F. PLATZER

AIRFOIL INCLUDING FLUIDICALLY CONTROLLED JET FLAP

This invention relates in general to airfoils and in particular to airfoils including a jet flap the deflection of which is fluidically controlled.

The problems involved in controlling the flight stability and the attitude of an aircraft have grown along with increases in the size and the maximum speed of the aircraft. The flight control system of an aircraft must enable the aircraft to maintain stability in all planned flight regimes, and this must be accomplished within the practical design limits of control surface area, the amount and rate of deflection of such control surfaces, and the structural load imposed on the airframe by the control surface deflection at operational speed. Aircraft designers, accordingly, have sought aircraft attitude and stability control techniques which produce the desired control effectiveness and rapid response to manual or automatic inputs, while minimizing negative factors such as added weight and complexity of the controlling apparatus, inability of the control surface to respond to transients such as gusts, and airframe fatigue.

Many techniques have been proposed in any attempt to overcome the foregoing problem. One of these techniques is known as the "jet flap" and consists of an arrangement of one or more fluid flow openings disposed along the trailing edge of an airfoil such as a wing or a control surface. A gaseous fluid such as air is supplied to the fluid flow openings through suitable ducting to establish a jet sheet which is blown substantially downstream of the airfoil trailing edge. This jet sheet operates in a manner known to those skilled in the art to cause an effective increase in the apparent width or chord of the wing, or the portion thereof affected by the jet flap. Moreover, appropriate angular orientation of the jet sheet causes an upward or downward lifting force to be applied to the wing so that the jet flap exhibits some of the functional characteristics of a control surface such as an aileron or a rudder.

The vector direction of the lift-modifying effect which the jet flap imparts to an airfoil depends upon the angular alignment between the airfoil and the jet sheet emanating therefrom, as is recognized by those skilled in the art. For example, a jet flap mounted in the trailing edge of a wing and producing a downwardly deflected jet sheet imparts to the wing an upward force component caused by the reduced static pressure on the wing upper surface and the increased static pressure on the wing lower surface arising from the effect of the jet flap on air circulation around the wing, and imparts an additional upward force component caused by the reaction thrust of the air blown from the jet flap openings to establish the downwardly directed jet sheet. Conversely, a downwardly deflected jet sheet imparts negative or downward induced pressure lift and reaction thrust.

Prior art schemes have been proposed for selectively varying the angle of deflection of a jet flap. Such proposals have required the physical movement of some jet flap component such as a nozzle or a flow deflecting structural member, a requirement which not only adds unwanted weight to the aircraft but which also requires additional actuating apparatus in the relatively confined area of an aircraft wing or a portion thereof. Moreover, the use of mechanically actuated devices to control the deflection of the jet flap poses control response problems arising from the inertia of the mechanical deflection elements which must be manipulated and of the power actuators required for such manipulation. The frequency response limitations of a mechanically actuated jet flap deflection system have precluded the use of the jet flap in applications such as flight flutter testing or gust alleviation, for example, where the response time of the jet flap to a rapidly fluctuating input signal must be minimized.

Airfoils including a jet flap having a variably deflectable jet sheet are also useful in nonflight applications such as wind tunnel airflow control, for example.

Accordingly, it is an object of this invention to provide an improved jet flap.

It is another object of this invention to provide an airfoil including an improved deflectable jet flap.

It is still another object of the present invention to provide an airfoil having a jet flap which is selectively angularly deflectable without resort to mechanical fluid stream deflecting apparatus.

It is a further object of this invention to provide an improved flow controlling apparatus for use in wind tunnels or the like.

Other objects and many of the attendant advantages of the present invention will be readily apparent from consideration of the following specification relating to the annexed drawings in which:

FIG. 1 shows an aircraft equipped according to an embodiment of the present invention;

FIG. 2 is a section view taken along line 2—2 of FIG. 1;

FIG. 3 shows a schematic operating diagram of the apparatus depicted in FIGS. 1 and 2;

FIG. 4 shows an isometric and partially schematic view of another embodiment of the present invention as used to control the flow of air in a wind tunnel;

FIG. 5 shows a section operational view of the apparatus depicted in FIG. 4;

FIG. 6 shows still another embodiment of the present invention, as attached to an aircraft wing to induce testing forces therein; and FIG. 7 shows a section isometric view of another embodiment of the present invention as built into an airfoil.

The present invention, stated in general terms, comprehends a jet flap contained in an airfoil and including a main jet which is aligned to establish a jet sheet extending generally as a continuation of the airfoil chord when the jet sheet is undeflected. One or more control jets are positioned to direct an airstream at a substantial angle to the undeflected jet sheet. The fluidic forces caused by impingement of the control jet stream on the jet sheet cause the path of travel of the jet sheet to be deflected. The change in the direction of jet sheet flow causes a corresponding change in the airfoil forces attributable to the main jet.

FIGS. 1, 2, and 3 show a particular embodiment of the present invention applied to an aircraft indicated generally at 10 and having wings 11 and 12. Jet flap apparatus, as indicated at 13 and 14, is installed along a generally outward portion of the trailing edges 15 and 16, respectively, of each of the wings. The jet sheet 17 produced by the jet flap 13 is depicted by FIG. 1 as being deflected downwardly, while the jet sheet 18 produced by the jet flap 14 is depicted as being deflected upwardly; the incremental forces imparted to the wings by the jet sheet deflections shown in FIG. 1, denoted by the arrows adjacent the wing tips, thus tend to impart a clockwise rolling motion to the aircraft, and so the jet flaps in the depicted mode of operation are functionally comparable to ailerons. It will be understood of course, that the aircraft 10 may employ conventional ailerons in addition to the depicted jet flaps.

The operation of the jet flap is more readily apparent from the section view of the view of the wing 11, as depicted in FIG. 2, and the schematic operational diagram of FIG. 3. A spanwise conduit or plenum 22 is disposed in the wing 11 so that the plenum is adjacent the wing trailing edge for at least the spanwise extent of the jet flap 13. The plenum 22 is connected by suitable plumbing 23 and a valve 24 to a suitable fluid source, such as air pressure source 25. A number of orifices 26 communicate with the exterior of the plenum 22 and are aligned in a spanwise direction along the wing to direct pressurized air from the plenum in a direction generally aft of the wing trailing edge 15 to form a jet sheet 17 which can be generally parallel with the wing chord when the jet sheet is undeflected. The air pressure source 25 can be any suitable source, such as bleed air from one or more turbofan engines or fluid pressure derived from an auxiliary power unit contained on the aircraft.

Contained in the wing trailing edge 15 in a spanwise direction are an upper control plenum 27 and a lower control plenum 28, each of which is positioned adjacent to the plenum 22 to be on opposite sides of and spaced apart from the region whereat air forming the jet sheet 17 exits from the main plenum orifices 26. The upper control plenum 27 has a plurality of control orifices 29 positioned in a spanwise direction to direct a fluid stream from the upper control plenum downwardly and substantially perpendicular to the fluid stream emanating from the main plenum orifices 26. The lower control plenum 28 similarly contains a plurality of control orifices 30 which are positioned in a spanwise direction to direct a fluid stream from the lower control plenum upwardly and substantially perpendicular to the undeflected jet sheet produced by fluid flow from the orifices 26.

The use of the orifices 26, 29, and 30 to direct fluid flow from the main plenum and the control plenum is for illustrative purposes only, it being understood that any fluid flow openings, such as slots communicating with the appropriate plenum and extending in a spanwise direction along the wing, can be substituted for the aligned individual orifices.

The control plenums 27 and 28 are connected by respective conduits 34 and 35 to control valves indicated schematically at 36, which selectively supply air pressure from the source 25 to the control plenums in response to attitude control signals received from 37. The attitude control signals can be derived from prior art mechanisms such as gyros, accelerometers, and the like, which produce an output signal in response to the position or the rate of movement of the aircraft. Alternatively, the attitude control signal can be partially or completely derived from pilot input to a control wheel. The attitude control signals cause actuation of the control valves 36 to supply air pressure to the control plenums as appropriate to accomplish the desired deflection of the jet sheet 17, outlined below. It is understood, of course, that the other wing 12 of the aircraft has a similar arrangement of main plenum, control plenums, and control valves operative in response to the source of control signals 37.

In considering the operation of the embodiment described thus far, assume that the attitude control signal 37 has commanded the jet flaps to impart a right-hand or clockwise roll motion to the aircraft, as depicted in FIG. 1. The control valve 36 open responsive to such signal so that air pressure flows from the source 25 through the conduit 34 to the upper control plenum 27. If the jet flap is not already in operation at the beginning of the roll maneuver, the valve 24 also must be opened at the command of the pilot or another control signal to supply air pressure to the main plenum 22. At the same time, the roll control signal causes initiation of air flow into the lower control plenum (not shown) associated with the jet flap 14 on the wing 12. Referring now to FIG. 2, it can be seen that pressurized air supplied to the main plenum 22 exists through the orifices 26 to form a jet sheet which is aimed in a substantially chordwise direction aft of the trailing edge of the wing 11, if no pressurized air is supplied to either of the control plenums 27 and 28. SInce the upper control plenum 27 is pressurized, however, air flows from that plenum through the control orifices 29 to impinge on the jet sheet 17 adjacent its point of exit from the orifices 26 and substantially at a right angle thereto. This impingement of the control jet on the main jet forming the jet sheet 17 causes the jet sheet to be deflected in a downwardly direction, as shown in FIGS. 1 and 2, it being understood that the jet sheet 18 extending from the wing 12 is similarly deflected upwardly by pressurized air emanating from the control orifices of the lower control plenum associated with that wing. This deflection of the jet sheets causes a corresponding change in the incremental force components resulting from the principles of jet flap operation, such as the jet reaction thrust and the jet-induced pressure lift of the jet flap, so that the incremental lift imparted to the wing 11 by the jet flap is increased by the downward deflection of the jet sheet 17 while the incremental lift imparted to the wing 12 by the jet flap is diminished or made negative, i.e., a downwardly-directed force, by the upward deflection of the jet sheet 18. The effect of this lift imbalance causes the aircraft to roll in a clockwise direction.

The attitude of the aircraft can be controlled by simultaneous deflection of both jet flaps 13 and 14 in the same direction. For example, assume that the attitude control signal 37 includes a vertical accelerometer connected to sense the rate of vertical movement of the aircraft. The accelerometer senses an unwanted upward acceleration resulting from the incremental lift generated by some transient factor, such as a sudden gust, and commands the control valves 36 to supply pressurized air to the lower control plenums of each of the jet flaps 13 and 14 at a rate of flow selected to deflect the respective jet sheets 17 and 18 to the extent necessary to reduce or overcome the unwanted incremental lift. The reduction or elimination of the unwanted lift is sensed by the accelerometer to provide feedback for the attitude control system. The wing load alleviation resulting from this attitude control technique extends the fatigue life of the airframe and also produces a less bumpy ride for the occupants of the aircraft.

The present invention is especially useful in applications, as exemplified by the foregoing problem of gust alleviation, where a rapid response to an input signal is required. It can be seen that no moving parts are employed in the operation or deflection of the jet flaps. Movable valve elements contained in the control valves 36, being much smaller than the movable nozzle or deflector elements associated with prior art jet flap apparatus, are readily manipulated by electrical, hydraulic, or other techniques to provide the desired frequency response. Alternatively, the control valve function can be accomplished by fluidic switching techniques so that only the relatively small volume of air required to switch a fluidic valve need actually be controlled by a movable component.

The fluidically controlled jet flaps of the present invention can also function as spoilers, thereby avoiding the undesirable flow separating and aerodynamic drag found in conventional spoiler systems.

Still another application of the present invention is found in the inducement of flutter forces to an aircraft undergoing flight flutter testing. In lieu of the rotating vanes or eccentric weights employed in the prior art to apply flutter-inducing oscillatory forces to the wings of an aircraft, the jet flaps 13 and 14 can be operated in unison or as otherwise desired and at a relatively high rate of oscillation to apply the desired forces to the wing for testing purposes. For example, oscillatory forces of 30 cycles per second are readily applied to aircraft wings using the jet flaps of the present invention, with a control signal of the desired frequency being applied to the control valves 36.

The present invention also can be used to impart flight flutter testing forces to an aircraft not normally provided with jet flaps. The embodiment shown in FIG. 6, for example, includes an airfoil 41 affixed in a spaced-apart relationship to the wing 44 of an aircraft by means of pylons 42 and 43. A similar airfoil arrangement 47 is attached to a corresponding location on the wing 45 of the aircraft. Each of the airfoils 41 and 47 is equipped with fluidically deflectable jet flaps 46 and 48, as described herein, with the necessary conduits supplying pressurized air to the main plenums and the control plenums being routed through the pylons to the jet flaps 46 and 48. Pressurized air is supplied to the control plenums of either or both of the jet flaps 46 and 48 so that the jet sheets emanating therefrom are deflected to apply the desired flight flutter testing forces to the wings. In a typical application of the FIG. 6 embodiment the airfoils and supporting pylons would be temporarily installed on an aircraft used for flight flutter testing purposes, such installation requiring only the addition of the necessary ducting to the respective jet flaps. The airfoils 41 and 47 and the supporting pylons are readily removable if desired, once the flight flutter testing of the aircraft has been completed.

The apparatus depicted in FIG. 7 shows another embodiment of the present invention wherein the jet sheet is fluidically displaced to assume either of two discrete deflections. The airfoil 70 has a trailing edge member 71 fixedly or movably retained by supports 72 or the like spaced apart from the remainder of the airfoil to define an upper passage 73 and a lower passage 74. The passages 73 and 74 converge at a throat region 75 which is connected by means of the passage 76 to the main plenum 77. An upper control plenum 78 and a lower control plenum 79 are connected by respective control fluid passages 80 and 81. The main plenum 77 is connected to a suitable air pressure source and the control plenum are selectively supplied with air pressure as described above in the FIG. 3 embodiment.

Operation of the embodiment shown in FIG. 7 is accomplished by supplying pressurized air to the main plenum 77 sufficient to establish a jet sheet, and by supplying a relatively small flow of air to the one of the control plenum 78 and 79 which causes the jet sheet to shift to the desired one of the passages 73 and 74. For example, an upwardly-deflected jet sheet exiting from the upper passage 73 is obtained by pressurizing the lower control plenum 79 so that deflection control air enters the throat region 75 through the passage 81 to shift the jet sheet air flowing from the passage 76 to the upper passage 73. Downward deflection of the jet sheet through the lower passage 74 similarly is accomplished by pressurizing the upper control plenum 78. The control air pressure alternately supplied to the control plenums 78 and 79 is switched at a rate to produce the desired oscillation frequency of the jet flap.

Inasmuch as an airfoil having a fluidically controlled jet flap according to the present invention operates to modify the flow of air across and downstream of the airfoil, the airflow-modifying capabilities of such airfoils are not limited to use on an aircraft. For example, FIG. 4 shows a pair of airfoils 50 and 51 mounted to extend across the width of the model section of an otherwise conventional wind tunnel 52. The airfoils 50 and 51 are spaced apart from each other sufficiently to permit a test model 53 to be disposed either between or downstream of the two airfoils.

Each of the airfoils 50 and 51 includes a jet flap 54 and 55, respectively, located in the trailing edge of the airfoil and including a main plenum, an upper control plenum, and a lower control plenum, all as described above with reference to FIGS. 2 and 3. Pressurized air from a suitable source 56 is supplied through a valve 57 and a conduit 58 to the main plenums of each of the jet flaps 54 and 55. Each of the two upper control plenums is connected to receive pressurized air from a conduit 66 connected to a valve 63, while the two lower control plenums are similarly connected through a conduit 67 to a valve 64. The valves 63 and 64, which receive pressurized air from a conduit 62, are interconnected so that one of the valves is open while the other valve is closed. The valve operating mechanism 65 alternately switches the two valves 63 and 64 between their respective flow positions so that air pressure is alternately applied to both of the upper control plenums and then to both of the lower control plenums to cause synchronous deflections of the jet sheets 68 and 69. It is understood, of course, that the valves 64 and the valve operating mechanism 65 are shown by way of example only and that other suitable apparatus such as a fluidic switching mechanism or the like can be substituted.

Operation of the FIG. 4 embodiment is depicted in FIG. 5, where the jet flaps 54 and 55 are shown producing downwardly deflected jet sheets 68 and 69, resulting from pressurized air applied to both of the upper control plenums and, of course, the main plenums of the jet flaps. Since both of the airfoils 50 and 51 are spaced from the roof and the floor, respectively, of the wind tunnel, the synchronous deflection of the jet sheets modifies the airflow along the test model 53. In the FIG. 5 embodiment, for example, the placement of the test model 53 within the region extending from between the two airfoils to at least about four airfoil chord lengths downstream of the airfoils provides a useful region of suitably uniform deflected air flow. The deflection of the jet sheets can be varied and oscillated by the valve actuating mechanism 65 to subject the test model to an oscillatory flow of air. The invention embodiment depicted in FIGS. 4 and 5 thus provides a technique for varying the direction of airflow around a model in a wind tunnel without resort to the cumbersome and costly movable vanes and associated actuating mechanisms heretofore used.

While the described embodiments of the present invention all pertain to a fluidically deflected jet flap with an airfoil, it is known in the art that hydrofoils can be equipped with jet flaps whereby the lift of a hydrofoil is incrementally varied by the flow of a liquid, such as water, from a slot along the trailing edge of the hydrofoil. Accordingly, the jet flap deflection techniques and applications of the present invention are applicable to hydrofoils as well as airfoils; deflection of a hydrofoil jet sheet is obtainable, for example, by impinging a control stream of liquid substantially at right angles to the jet sheet.

Deflection of the jet sheet is accomplished in the embodiments described herein by impinging a fluid stream onto one side of the jet sheet, with the result that the pressure differential produced across the jet sheet causes the jet sheet to be deflected away from the region of greater pressure. Such deflection of the jet sheet also is obtainable, however, if the deflection-producing pressure differential is caused by applying suction to one side of the jet sheet to lower the fluid pressure thereat, relative to the ambient fluid pressure affecting the other side of the sheet. This is accomplished, for example, by applying suction to the control plenum 28 of FIG. 2 to reduce the fluid pressure on the under side of the jet sheet 17, with the result that the jet sheet is deflected downwardly.

It should be understood, of course, that the foregoing relates to only preferred embodiments of the invention and that numerous modifications or alterations may be made therein without departing from the spirit and the scope of the invention, as set forth in the appended claims.

What is claimed is:

1. A fluid dynamic apparatus comprising:
    a fluid foil having a trailing edge and including a fluid flow surface over which fluid flows in a direction generally toward said trailing edge in the operation of said foil;
    a plenum contained within said foil and connected to receive fluid pressure;
    fluid passage means disposed in said foil, said fluid passage means being in fluid flow communication between said plenum and a certain spanwise extent of said foil trailing edge and being operative to direct a jet sheet fluid stream in a substantially chordwise, downstream direction from said foil trailing edge;
    first control fluid flow means disposed in said foil and selectively connected in fluid flow communication with a source of fluid pressure,
    said first control fluid flow means positioned to direct a control fluid stream into flow direction modifying impingement along the spanwise extent of said jet sheet fluid stream emitted from said fluid flow means when said first control fluid flow means is in open fluid flow communication with said source of fluid pressure; and,
    second control fluid flow means disposed in said foil and selectively connected in fluid flow communication with a source of fluid pressure;
    said second control fluid flow means positioned to direct a control fluid stream into flow modifying impingement along the spanwise extent of said jet sheet fluid stream emitted from said fluid flow means when said second control fluid flow means is in open fluid flow communication with said source of fluid pressure;
    said first and second control fluid flow means being disposed on opposite sides of said jet sheet fluid stream to selectively direct the respective control fluid streams in opposed relationship toward said jet sheet fluid stream.

2. Apparatus as in claim 1, wherein said control fluid streams impinge said jet sheet fluid stream substantially perpendicularly thereto.

3. Apparatus as in claim 1, wherein:

said fluid flow means comprises a plurality of passageways defining openings in fluid communication with said plenum and arrayed in a spanwise direction along said portion of said trailing edge to direct pressurized fluid flowing therethrough to form a fluid layer extending generally downstream of said trailing edge;

said first control fluid flow means comprises a first control conduit selectively connected to a source of fluid pressure and disposed in a spanwise direction along said trailing edge portion, said first conduit being displaced to one side of said fluid layer and having a plurality of openings positioned to direct a fluid stream for direction modifying impingement on said fluid layer; and said second control fluid flow means comprises a second control conduit selectively connected to a source of fluid pressure and disposed in a spanwise direction along said trailing edge portion, said second conduit being displaced to the other side of said fluid layer to be positioned opposite and spaced apart from said first control conduit, said second control conduit having a plurality of openings positioned to direct a fluid stream for direction modifying impingement on said fluid stream.

4. Apparatus as in claim 3, wherein said openings of both said first and second control conduits are positioned to direct the respective fluid streams emanating therefrom for substantially perpendicular impingement onto said fluid layer.

5. Apparatus as in claim 3, wherein said foil comprises an element of the lift generation and modification portion of a vehicle; and further comprising:

control signal means producing an output signal in response to a desired vehicle attitude adjustment;

flow control means connected to control the flow of fluid to each of said first and second control conduits, said flow control means connected to be responsive to the output signal of said control signal means and being operative to supply fluid to the appropriate one of said control conduits to deflect the direction of flow of said fluid layer in a direction to impart to said foil a force increment tending to accomplish the desired attitude adjustment of the vehicle.

6. Apparatus for modifying fluid flow in a fluid flow region, comprising:

passageway means defining a fluid flow region through which the flow of fluid in a certain direction is permitted;

at least one fluid foil having a trailing edge and disposed in said passageway means so that the span of said foil is substantially transverse to the direction of fluid flow therethrough;

a fluid plenum disposed in said foil and connected to a source of fluid pressure;

fluid passage means disposed in said foil and communicating fluid flow between said plenum and the trailing edge of said foil to establish a jet sheet fluid layer extending generally downstream of said foil trailing edge;

first control fluid passage means disposed in said foil to direct a fluid stream into flow deflecting impingement along the spanwise extent of and at a substantial angle with one side of said fluid flow which establishes said jet sheet fluid layer;

second control fluid passage means disposed in said foil to direct a fluid stream into flow deflecting impingement along the spanwise extent of and at a substantial angle with the other side of said fluid flow which establishes said jet sheet fluid layer; and control means connected to selectively supply fluid flow to either of said first and second control fluid passage means.

7. Apparatus as in claim 6, further comprising:

another fluid foil having a trailing edge and disposed in said passageway means so that the span of said other foil is substantially transverse to the direction of fluid flow therethrough, said other fluid having a fluid flow plenum, fluid passage means, first control fluid passage means, and second control fluid passage means the same as the corresponding elements are disposed in and functionally interrelated with said one foil, said fluid flow plenum of said other airfoil being connected to a source of fluid pressure;

said foils being mounted spaced apart from each other in said fluid flow region in a dimension substantially transverse to said certain direction of passageway means fluid flow; and control means connected to selectively supply fluid flow to either of said first and second control fluid passage means of said other foil.

8. Apparatus as in claim 7, wherein:

said control means is connected to selectively supply fluid flow to both of said first control fluid passages or to both of said second control fluid passages so that said control means causes synchronous flow deflecting impingement of the control fluid streams with the respective jet sheet fluid layers.

* * * * *